United States Patent [19]
Webster

[11] Patent Number: 5,063,673
[45] Date of Patent: Nov. 12, 1991

[54] VEGETATION CUTTERS

[75] Inventor: Craig D. Webster, Newcastle-upon-Tyne, England

[73] Assignee: Black & Decker, Newark, Del.

[21] Appl. No.: 579,640

[22] Filed: Sep. 7, 1990

[30] Foreign Application Priority Data

Sep. 11, 1989 [GB] United Kingdom ............. 8920498

[51] Int. Cl.⁵ .......................................... A01D 50/00
[52] U.S. Cl. ........................................ 30/276; 30/347
[58] Field of Search ................... 30/276, 347, 12.7

[56] References Cited

U.S. PATENT DOCUMENTS

| | | |
|---|---|---|
| 4,274,201 | 6/1981 | Oberg et al. |
| 4,285,127 | 8/1981 | Zerrer et al. |
| 4,607,431 | 8/1986 | Gay ............................ 30/276 |
| 4,651,421 | 3/1987 | Zerrer . |
| 4,667,410 | 5/1987 | Weid et al. |
| 4,817,288 | 4/1989 | Hirose et al. |
| 4,866,846 | 9/1989 | Hoffmann et al. ........... 30/276 |
| 4,897,923 | 2/1990 | Collins ....................... 30/276 |
| 4,926,557 | 5/1990 | Haupt ......................... 30/276 |

FOREIGN PATENT DOCUMENTS 0171533 2/1986 European Pat. Off. .

Primary Examiner—Douglas D. Watts
Attorney, Agent, or Firm—Chuck E. Yocum; Dennis A. Dearing; Edward D. C. Bartlett

[57] ABSTRACT

A device for cutting vegetation has a housing rotatable about an axis, a rotatable spool within the housing storing a supply of flexible line having an end extending through an aperture in the housing into a cutting plane normal to the axis, and an arrangement for automatically letting out additional line by causing relative rotation between the spool and housing whenever the length of line extending into the cutting plane is less than a predetermined length. The automatic arrangement includes a series of angularly-spaced locking faces provided on the spool (or on a member connected thereto) or on the housing, and a balance bar pivotally mounted on the housing or on the spool with this balance bar having a member for engagement with the locking faces. The center of gravity of the balance bar is on the side of the pivot point opposite from the engagement member. In use, the balance of forces on the engagement member directs this member against the locking faces.

25 Claims, 5 Drawing Sheets

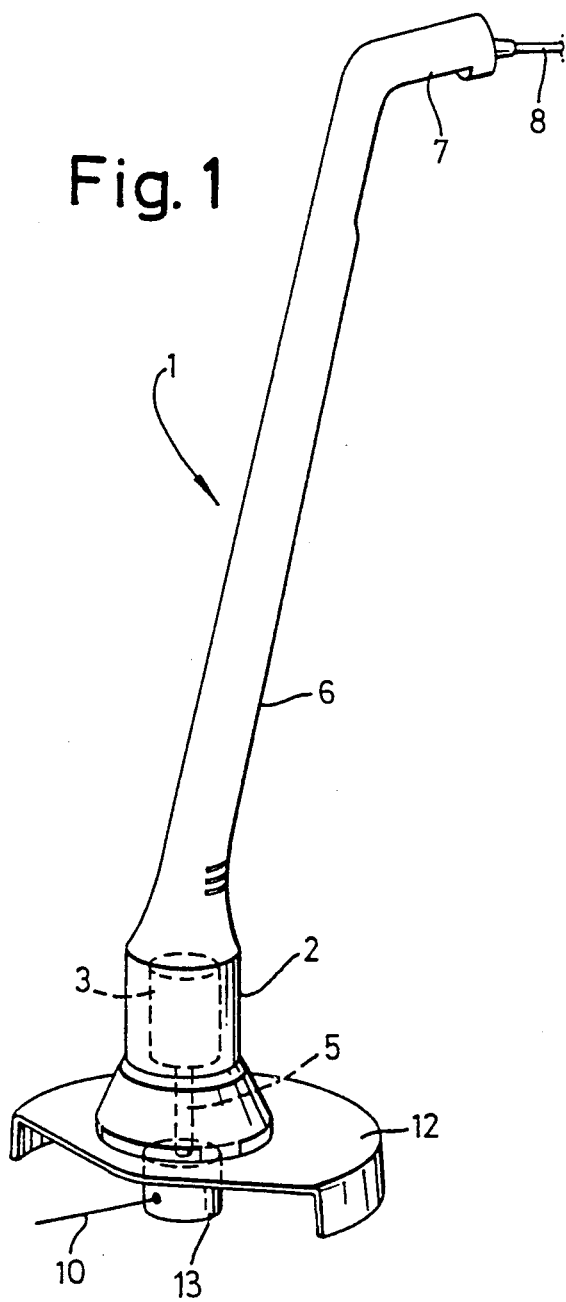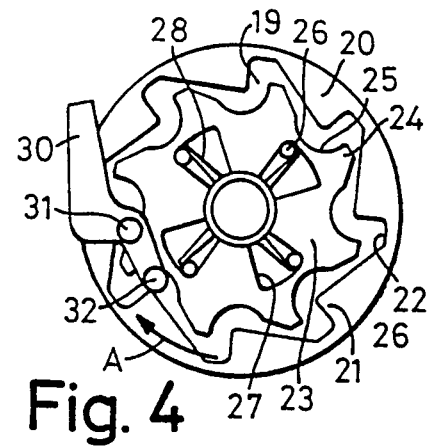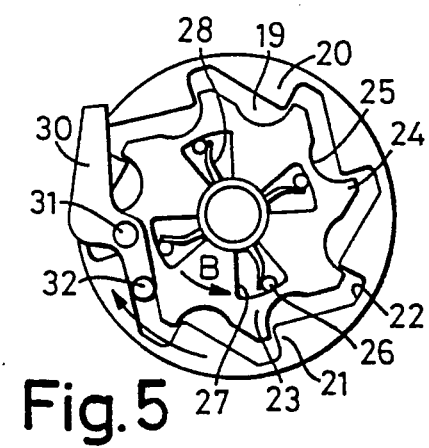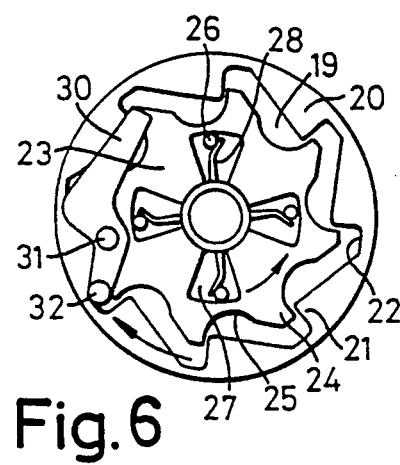

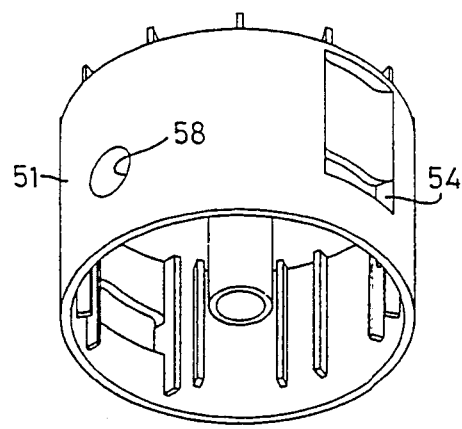
Fig. 8
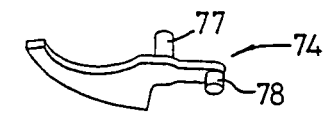
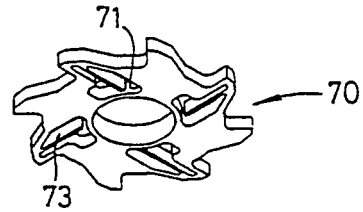
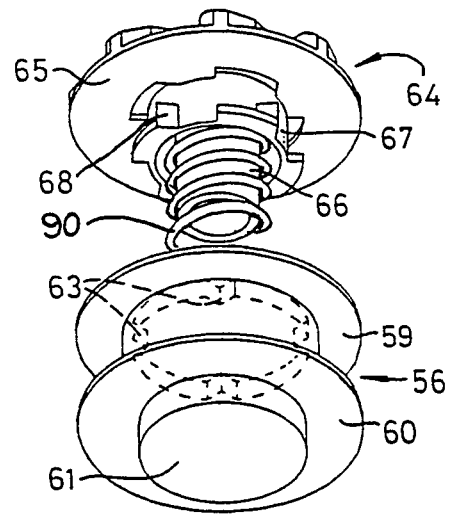
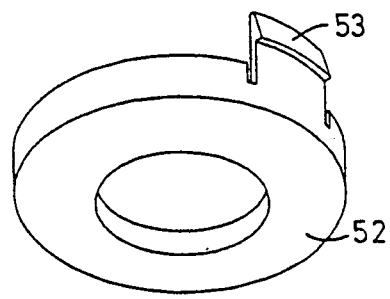

VEGETATION CUTTERS

FIELD OF THE INVENTION

This invention relates to vegetation cutters and has particular reference to cutters that cut by means of a filament or strip that is rotated rapidly about an axis that is usually substantially vertical but, for certain applications, can be horizontal.

BACKGROUND OF THE INVENTION

In most filament cutters, the cutting filament or strip is stored on a spool or reel from which a cutting length extends. During use, wear on the cutting length shortens that length and it is then necessary to withdraw filament or strip from the spool to make up the cutting length to its working value.

This withdrawal of the filament or strip from the reel may be performed by the operator, either manually, for example by turning off the cutter, grasping the end of the filament and pulling it out of the housing or by operating a feeding mechanism while the motor is still running. However, it is preferable that the withdrawal of filament be effected without the intervention of the operator as this requires less skill from the operator, who does not need to decide when more line is required and also avoids the need to interrupt a cutting operation. In the case of a filament trimmer in which the filament is rotated by an electric motor, it has been proposed to sense the motor current electronically and when a predetermined decrease in current is detected (indicating a decrease in load and hence cutting length) filament is withdrawn from the spool to increase the cutting length. Such an arrangement is costly and each cutter requires individual setting of the electronic sensors to ensure correct operation.

It has also been proposed to control the withdrawal of filament from the spool by means responsive to centrifugal force acting on a member which permits withdrawal of filament from the spool when the sensed centrifugal force is of a predetermined value. Many proposals of this nature have been made, but it has been found that because the means responsive to centrifugal force responds to changes in motor speed when running, such systems are not suitable for mass production. The running speed of the motor cannot be sufficiently reliably controlled during manufacture, and the cutter thus requires individual setting and adjustment to maintain consistent operation. In an alternative system, the means responsive to centrifugal force, responds to changes in centrifugal force experienced on start-up and stopping of the cutter, when no withdrawal of filament is needed, thereby wasting filament. In more recent proposals, for example those of EP-A-171,533 (Emerson) and US-4 607 431 (Gay), the withdrawal or feed of filament is performed automatically by balancing the pull on the filament extending from the head into the cutting plane resulting from centrifugal force against the centrifugal force acting on a fixed or reference counterweight using a pivoted balance bar. This has the advantage of making the line feed independently of the speed of rotation, but in the Emerson system this has involved the line making frictional contact with the balance bar, impeding the freedom of the line to feed from the spool and in both the Emerson and the Gay systems there is a possibility that the balance bar will not return to a locking position after an increment of line has been fed thus allowing further line to feed. The operation of the device is thus made less reliable.

SUMMARY OF THE INVENTION

It is an object of the present invention to provide a device for cutting vegetation which is of relatively simple construction, can be used with both electrically- and petrol-operated machines, and in which withdrawal of the cutting filament or strip to the working length operates on an automatic basis.

According to the invention a device for cutting vegetation comprises
(i) a housing rotatable about an axis,
(ii) a rotatable spool within the housing storing a supply of flexible line having an end extending through an aperture in the housing into a cutting plane normal to the axis; and
(iii) means for causing relative rotation between said spool and said housing whenever the length of line extending into the cutting plane is less than a predetermined length, to cause additional line to be fed into the cutting plane;
wherein said means comprise
  (a) a series of angularly-spaced provided on the spool (or on a member connected thereto) or on the housing;
  (b) a balance bar pivotally mounted on the housing or on the spool (or on the member connected thereto), the balance bar having a member for engagement with the locking faces, the centre of gravity of the balance bar being on the side of the pivot point opposite from the said member, and
  (c) means tending to direct the said member onto the locking faces.

In an alternative embodiment, a device for cutting vegetation comprising
(i) a housing rotatable about an axis;
(ii) a rotatable spool within the housing storing a supply of flexible line having an end extending through an aperture in the housing into a cutting plane normal to said axis; and
(iii) means for causing relative rotation between said spool and said housing whenever the length of line extending into said cutting plane is less than a predetermined length, to cause additional line to be fed into said cutting plane;
wherein said means comprises
  (a) a series of angularly-spaced locking faces provided on the spool (or on a member connected thereto) or on the housing;
  (b) a balance bar pivotally mounted on the housing or on the spool, said balance bar having a member for engagement with said locking faces; and
  (c) means for positively engaging said member onto said locking faces.

In this embodiment, said balance bar is preferably mounted so that the centre of gravity of said balance bar is on the side of the pivot point opposite said member for engagement.

Preferably the housing is attached to the shaft of a motor, by which it is rotatably driven, and the housing in turn drives the spool. Alternatively, the spool may be directly driven from the motor, and in turn drive the housing. In a further embodiment there may be an intermediate member connected between the housing and the spool which, when the housing is driven, transmits this drive to the spool, and vice versa.

The angularly spaced locking faces may be formed on the spool and the balance bar may be pivotally mounted on the housing. This construction may be reversed, however, with the spaced locking faces being formed on the housing and the balance bar being pivotally mounted on the spool. In a particularly advantageous arrangement, the balance bar is pivotally mounted on the housing and the spaced locking faces are provided on the intermediate member connected to the spool. This is advantageous because the spool must be removable by the operator when the filament supply is exhausted. The provision of the locking faces on the intermediate member simplifies removal of the empty spool and reloading of a new spool. The housing is positively driven, and this drive is transmitted to the spool by way of the balance bar and the intermediate member. There may be one-way clutch means between the spool and the intermediate member so that, if desired, the spool may be rotated independently of the intermediate member when the cutter is not operative. This can provide a manual override for the line feed mechanism.

In one embodiment the locking faces are part of a continuous series of spaced teeth and recesses formed in and adjacent the periphery of a flange of the spool, the recesses in fact forming the locking faces. The means for directing the member on the balance bar onto the locking faces preferably comprises a cam mounted radially inwardly of the series of locking faces and rotatable therewith, the cam having a surface or surfaces cooperating with the member on the balance bar and the locking faces to direct the member on the balance bar onto the locking faces during the relative rotation between the spool and the housing. In this embodiment it is preferred that the cam should be mounted so as to be capable of limited rotation relative to the series of locking faces. This limited relative rotation may be opposed by spring means.

In operating the vegetation cutter of the invention, the motor is started and drives the shaft, the housing and the spool (and the intermediate member when such is used) in unison, the housing, being coupled via the balance bar with the spool and, where appropriate, the intermediate member. When the cutting line is at its proper cutting length, the member on the balance bar is fast against a locking face, held there by the tension in the line, which manifests itself as a torque acting on the spool, being greater than the opposing component on the locking face of the torque generated by the balance bar. As the cutting line diminishes in length the component generated by the balance bar becomes equal to or greater than that generated by the tension in the line, and the balance bar is able to pivot, this in turn allowing the member on the balance bar, suitably a peg or pin, to be released from the locking face. The spool is thus enabled to rotate independently of the housing, and replacement line is payed out. The balance bar pivots in the opposite direction, and the peg attached to it is urged into engagement with the next succeeding locking face in the angularly-spaced series, thus allowing comparison of the force component generated by the balance bar with that generated by the line. The process may be repeated if there is still an imbalance because the line is still too short. When the cutting line is again at its proper cutting length, the housing and spool can then rotate in unison.

BRIEF DESCRIPTION OF THE DRAWINGS IN THE ACCOMPANYING DRAWINGS:

FIG. 1 is a general perspective view of a first embodiment of a vegetation cutter in accordance with the invention;

FIGS. 4-6 are views similar to that of FIG. 3, showing the position of various components of the cutter head at various stages during its operation;

FIG. 8 is an exploded view of the head of FIG. 7, showing the individual components thereof;

DETAILED DESCRIPTION OF THE PREFERRED EMBODIMENTS

Figure 2:
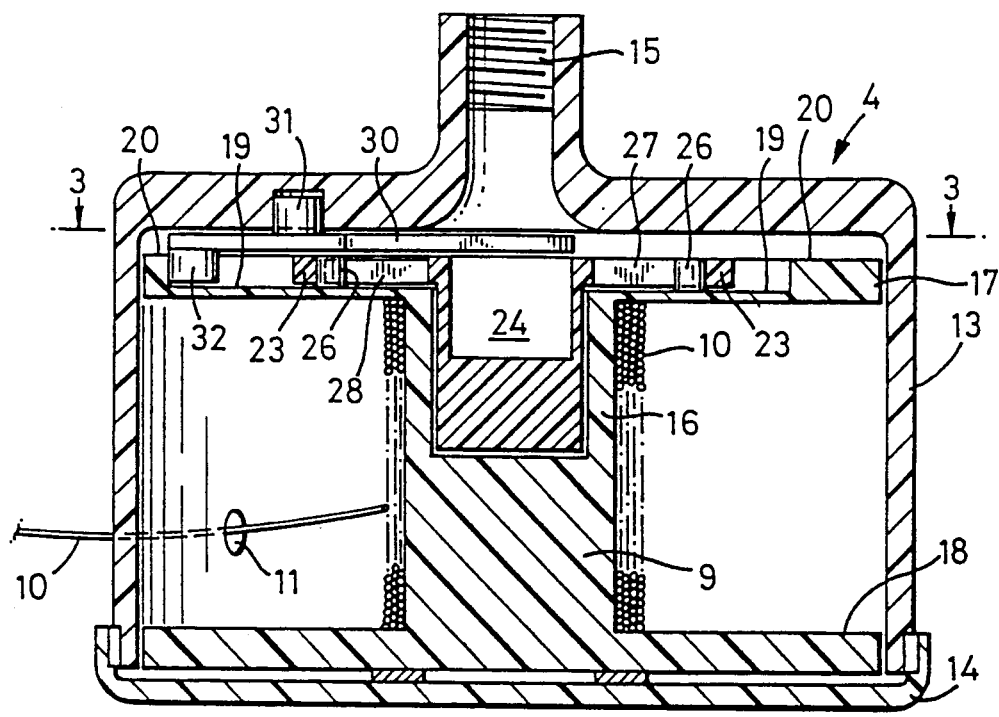
FIG. 2 is a cross-section of the head portion of the cutter of FIG. 1.

Referring firstly to FIG. 1, which is a perspective general view of a cutter, the cutter 1 has a housing 2 that accommodates an electric motor indicated by dotted rectangle 3 which, in use, rotates a head 4 (See FIG. 2) secured on the output shaft 5 of the motor 3. The housing 2 is interconnected by a tube 6 to a handle 7 which houses an electric switch controlling the energisation of the motor 3 from a power supply connected to the switch via a drop-lead connector 8.

Housing 2 accommodates a spool 9 (FIG. 2) carrying a supply of flexible line or filament 10 the free end portion of which extends from the housing through an aperture 11 in the side wall of the housing.

Detachably secured to the lower end of the housing 2 is a guard 12 which suitably comprises a cutting blade (not shown) for limiting the length of line 10 extending from the head 4.

As will be better seen from FIG. 2, the head 4 comprises a housing 13 to which is attached, e.g. by a screw thread or bayonet joint, a cover or cap 14. The housing 13 is screw-threaded at 15 to receive the screw-threaded end of drive shaft 5.

The housing 13 encloses the spool 9, which comprises a central tubular portion 16 and upper and lower flanges 17, 18 respectively. The flexible line 10 is wound about the central tubular portion 16, and extends therefrom through aperture 11 into the cutting plane. The upper flange 17 of the spool 9 is centrally recessed, as at 19, to provide a land 20 providing a series of angularly-spaced alternate teeth 21 (FIG. 3) and recesses 22 forming locking faces C. The cut-away central portion of the upper flange 17 also accommodates a cam member 23, which has a downwardly-depending tubular central portion 24 which sits in tubular portion 16 of the spool 9. The cam formed on cam member 23 is of substantially complementary form to that of land 20, and consists of spaced teeth 24 and recesses 25. The cam member 23 is able to rotate relative to a spool 9 to a limited extent. This limited relative rotational movement is restrained by upstanding pegs 26 integrally moulded on upper flange 17 which cooperate with sector-shaped cut-outs 27 formed in cam member 23. The limited rotational movement of cam member 23 relative to spool 9 is opposed by leaf springs 28 integrally moulded with cam member 23.

Figure 3:
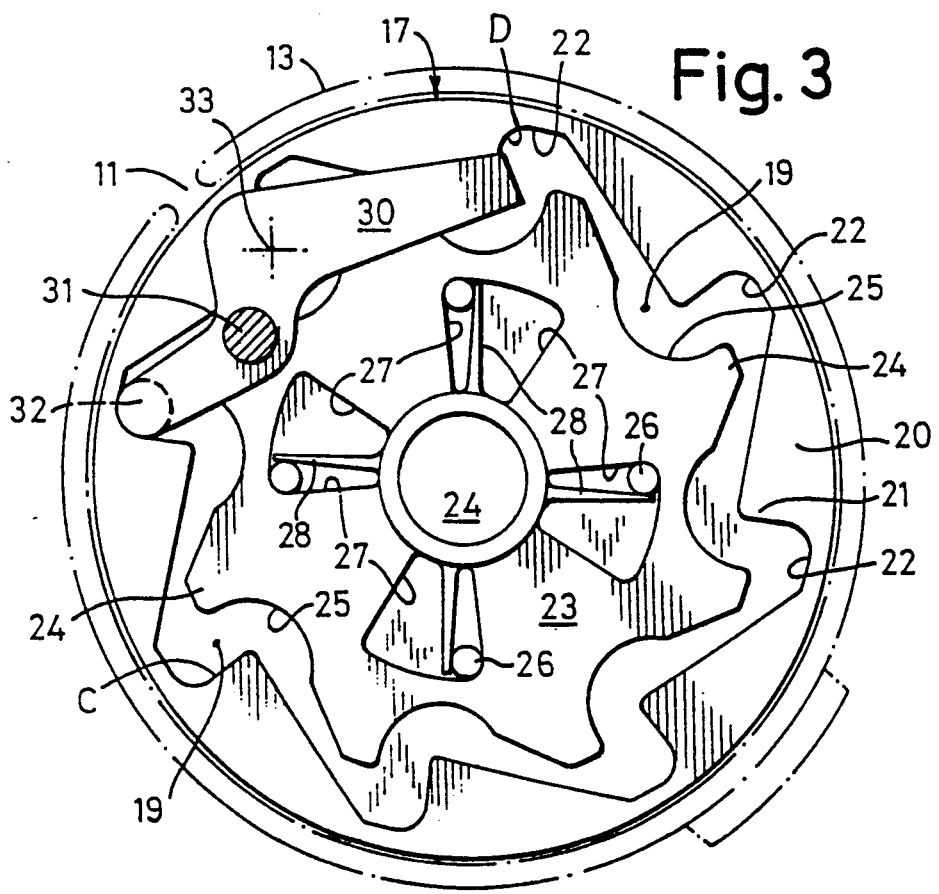
FIG. 3 is a section taken on the line 3—3 of FIG. 2.
Figure 7:
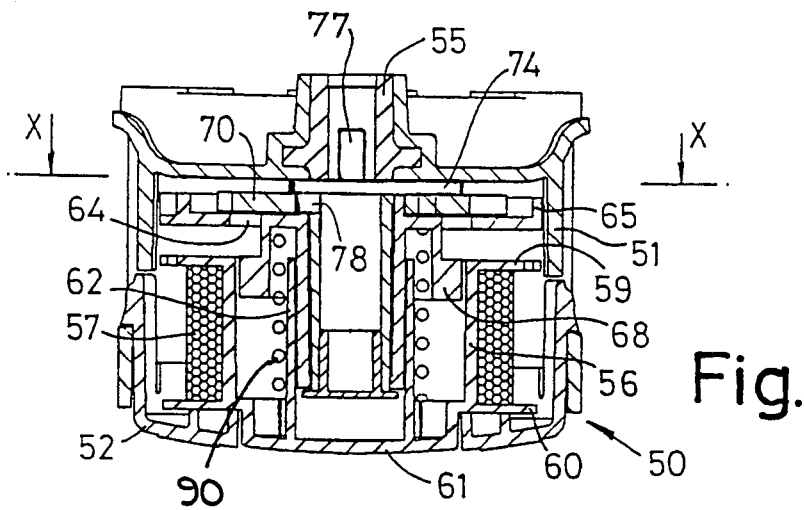
FIG. 7 is a cross-section of the head of a second embodiment of a vegetation cutter in accordance with the invention.
Figure 9:
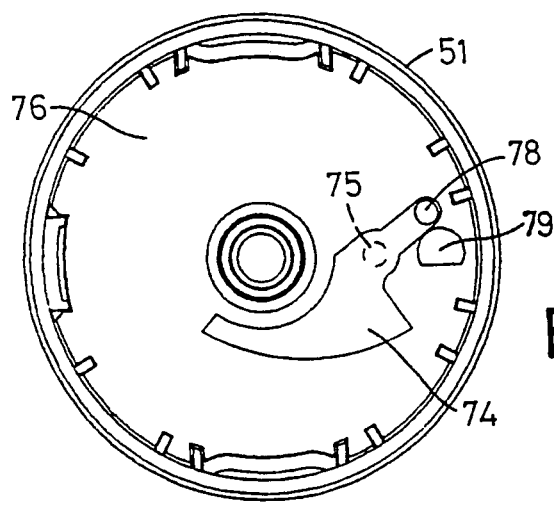
FIG. 9 is an underneath view of part of the housing of the cutter of FIG. 7.
Figure 10:
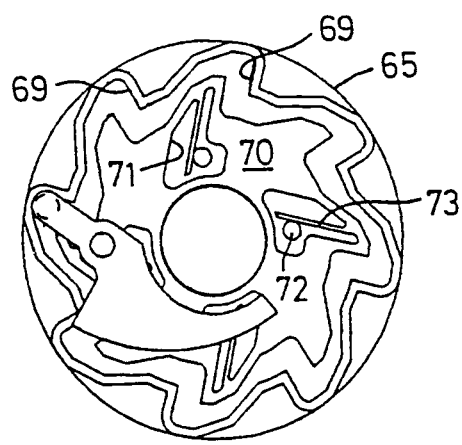
FIG. 10 is a view taken on the line X—X of FIG. 7.

A balance bar 30 is pivotallY mounted, by means of a pivot pin 31, in the downwardly-facing surface of the top of the housing 13. The balance bar is of cranked shape, as best seen in FIG. 3, and has a downwardly-depending peg 32 at one end. The peg 32 rides in the path formed by land 20 and cam member 23. The centre of gravity of the balance bar 30 is on the side of pivot 31 remote from peg 32, and is indicated as at 33.

The operation of the machine will be described with reference to FIGS. 3 to 6.

In operation the length of flexible line 10 extended into the cutting plane is detected by comparing the force generated by the rotating mass of the extended line with the force generated by a reference mass, i.e. the balance bar 30, within the cutting head. As is seen in FIG. 3, the reaction force taken from face C of tooth 21 (F2) is in opposition to a reference force (F3) produced by the balance bar 30 via the peg 32.

When the cutting head is rotated, a moment is generated around the pivot pin 31, urging the balance bar 30 to oppose the force (F2) generated by the spool due to line tension. As during normal running conditions, the force (F2) is greater than the reference force (F3), the peg 32 is lockingly held against a face D provided by a recess 22. As the line 10 becomes shorter during use, its mass decreases and its centre of gravity moves radially inwards. Thus, the centrifugal force (Fl) on the line is reduced.

There comes a point during the operation of the cutter head when the force (F2) derived from the extended length of line 10 becomes less than or equal to the reaction force (F3) generated by the balance bar 30. This is set by the design of the components of the head to be the point at which the line is deemed to be too short for efficient operation. At this point the balance bar 30 moves into the position shown in FIG. 4. The peg 32 moves out of the recess 22, and releases the spool 9 to rotate, in the direction of arrow A, a small distance relative to the housing 13, thus initiating feeding out line 10 into the cutting plane.

The balance bar 30 is returned to the position shown in FIG. 3 by the rotation of the spool 19 and the cam member 23, i.e. by being "urged" along the restricted path formed between land 20 and cam member 23. The peg is positively directed into each recess 22 in turn ensuring contact with locking face C by the action of cam member 23. The cam member 23 is able to rotate through a limited arc about the same axis as the spool 9. At its two extremes of angular movement it serves to form a path for the peg 32 to follow, as is seen in FIGS. 4 to 6. In order for the peg 32 to travel from the position shown in FIG. 4 to that shown in FIG. 6, the cam member 23 rotates in the direction of arrow B (see FIG. 5), thus ensuring that peg 32 returns to contact locking face C of recess 22, thus allowing the reaction force (F2) to act upon the balance bar. At this point the balance bar 30 cannot move from the position shown in FIG. 6 to the position shown in FIG. 4 until the cam member 23 has returned to the position shown in FIG. 3.

The leaf springs 28 acting against pins 26 ensure that the peg 32 is positively biased towards recess 22, while the line is feeding.

Thus, the system described provides a fully-automatic means for maintaining the extended length of line 10 at the optimum cutting length. When the line shortens below the optimum length the balance bar 30 pivots in the housing 13, as shown in FIGS. 3 to 6, to allow a limited rotational movement of the spool relative to the housing 13 in order to feed out extra line. When the extra line has been fed, the balance bar 30 is positively pivoted back to its normal operating position. Operator involvement in the feeding out of line is unnecessary.

It will be appreciated that many variations are possible within the scope of the invention. For example, the balance bar 30 may be pivotally mounted on the cover 14, and the locking faces formed in the downwardly-facing surface of the lower flange 18 of spool 9. Alternatively, the balance bar 30 may be pivotally mounted on the upper or lower flanges 17, 18 of the spool 9, the locking faces being formed on the upper internal surface of housing 13 or the internal surface of cover 14.

The cutter head shown in FIGS. 7 to 10 is similar in many respects to that of FIGS. 1 to 6, but differs therefrom in that it enables the feed of cutting line to be performed manually when the cutter head is at rest.

The cutter head, indicated generally as 50, comprises a cylindrical housing 51 and a cap member 52 releasably attached to the housing 51 by engagement of a flexible tongue 53 (of which there may be more than one) engaging in an aperture 54 in the housing 51 (see FIG. 8). Housing 51 is provided with a coupling 55 for attachment to a drive shaft such as shaft 5 of FIG. 1.

Located within housing 51 is a rotatable spool 56 carrying cutting line 57 the cutting end of which extends through aperture 58 in housing 51. Spool 56 includes upper and lower flanges 59, 60, and a slightly convex circular bottom wall 61 with which is integrally formed an annular wall 62. The spool 56 is provided with radially-inwardly extending dogs 63 (see FIG. 8).

Also within housing 51 is a cam member 64, which comprises a disc-like circular flange 65 from which depends an inner annular wall 66. An outer annular wall 67 of the cam member carries driving dogs 68 which, in the normal operating mode of the cutter head, are in driving engagement with the dogs 63 of the spool 56. This driving engagement of the dogs 63 and 68 is maintained by a helical spring 90 which is disposed between the inner and outer annular walls 66, 67 of the cam member 64 and the bottom wall 61 of the spool 56.

The upper face of the flange 65 of the cam member 64 is contoured to provide a series of angularly-spaced locking faces 69 (see FIG. 10) Mounted radially inwardly of the series of locking faces 69 is a cam 70, which has a peripheral surface complementary in shape to the land forming the series of angularly-spaced locking faces 69. The cam 70 is able to rotate relative to cam member 64 to a limited extend. This limited relative movement between cam 70 and cam member 64 is restrained by cut-outs 71 on the cam 70 and engaging upwardly-directed pins 72 formed on the top surface of flange 65. This limited relative rotational movement of cam 70 is opposed by leaf springs 73 integrally moulded with the cam 70.

A balance bar 74 is pivotally mounted, at 75, in the upper wall 76 of housing 51. The balance bar 74 has a pivot pin 77 and a downwardly-depending peg 78 which engages the locking faces 69 and moves along the path delineated by locking faces 69 and the periphery of cam 70. A stop 79 is provided on wall 76, to limit the inwards movement of balance bar 74.

The embodiment shown in FIGS. 7 to 10 operates in a similar manner to that of FIGS. 1 to 6. Thus, housing 51 is driven by the output shaft 5, and drives the spool 56 through the balance bar 74 and the cam member 65, the driving dogs 68 of which engage the dogs 63 of the spool 56. When the extended line 57 becomes shorter than the norm, the balance bar 74 pivots in the same way as described in connection with FIGS. 4 to 6 hereinabove, allowing the spool 56 to rotate relative to the housing 51, and pay out an amount of line 57 sufficient to restore the cutting line to its desired length.

If desired, line 57 may also be payed out manually. Thus, with the head 50 at rest, the bottom wall 61 of spool 56 may be pressed upwardly in the housing 51, against the action of spring 90. This upwards movement of the spool places the dogs 63 and 68 clear of each other, so that the spool 56 may rotate freely in the housing 51. This enables manual grasping and feeding of the line 57, thereby overriding the automatic feed which is the main feature of the device.

The cutter of the invention may be used in association with a motor that has a positive torque speed gradient, such as a series-wound AC motor. The effect of this is that when the line 10 is shortened the speed of the head will increase, due to the decrease in load. This has the effect of magnifying the difference between the force on the line and the force on the balance bar over the complete cycle, thus increasing the precision of the construction.

The reaction torque on the spool depends on the line force and the amount of line left on the spool (i.e. the radius upon which the line force acts to produce the torque diminishes as the line feeds out). Also, the amount of line fed out at any one time diminishes as the amount of line left on the spool diminishes (i.e. the angular rotation remains constant but the arc length changes with diminishing radius). The net effect of this is that the minimum length at which the mechanism decides to feed out line, and the amount of line fed out, will change as the length of line left on the spool decreases. These factors must be borne in mind when the precise design of the components of the system is formulated.

Figure 11:
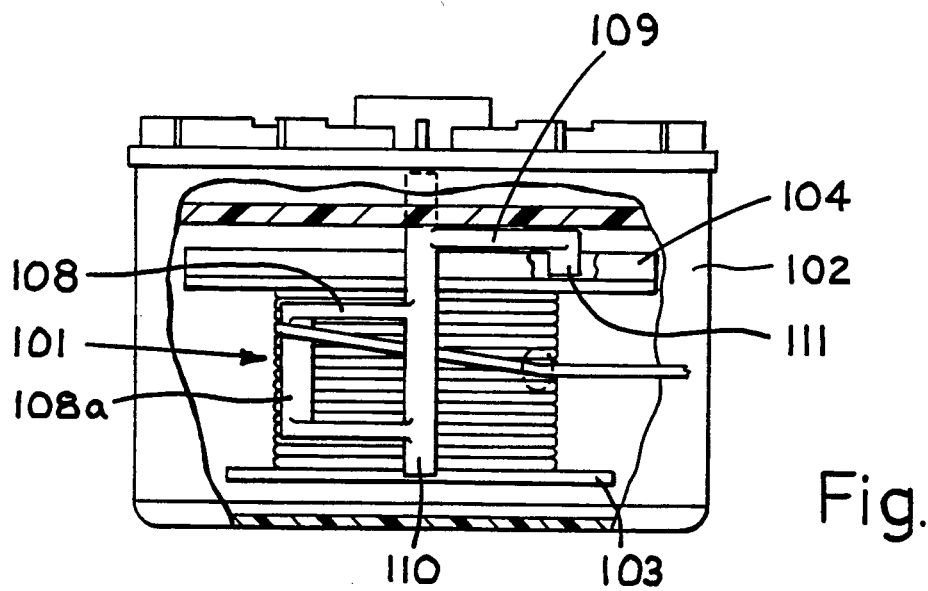
FIG. 11 is a part cross-section of the head of a third embodiment of a vegetation cutter in accordance with the invention and FIG. 12 is a view taken on the line XII—XII of FIG. 11.
Figure 12:
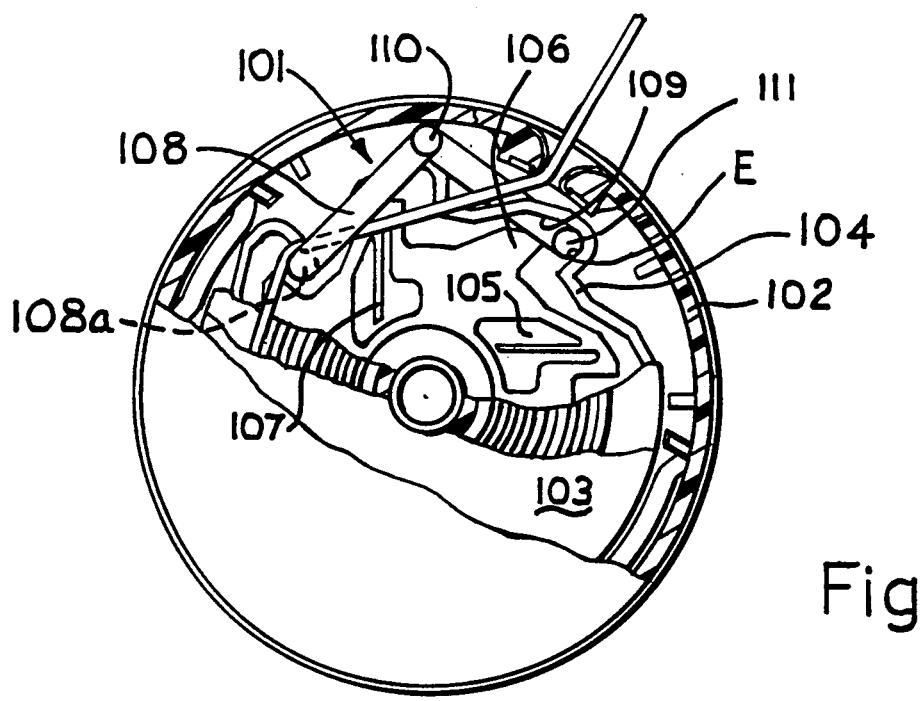

The cutter head shown in FIGS. 11 and 12 is similar in many respects to that of FIGS. 1 to 6, but differs therefrom in that the balance bar 101 is pivotally mounted on the housing 102 at a point outside the diameter of the spool 103. The upper flange of the spool 103 has an integrally moulded upstanding rib 104 and upstanding pegs (not shown) which co-operate with sector shaped cut-outs 105 and springs 107 formed in a cam member 106 in a similar manner to that of the cutter of FIGS. 1 to 6. As described with respect to the cutter shown in FIGS. 1 to 6, the limited rotational movement of cam member 106 relative to the spool 103 is opposed by leaf springs 107 integrally moulded with cam member 106.

The balance bar 101 comprises two members 108, 109 on a pivot pin 110. The first member 108 is a stirrup shaped member comprising two horizontal branches bridged at their outer ends by a vertical bight portion 108A, with the pivot pin 110 bridging and projecting past the inner ends of the two branches outer end The second member 109 comprises an arm at the of which is fitted an engaging member 111 which returns the balance bar 101 from initial feed position in a similar manner to the engaging member 32 of the bar 30 of the cutter of FIGS. 1 to 6 to restore contact with a locking face E.

The centre of gravity of the balance bar 101 is on the member 108, on the side of the pivot 110 remote from the engaging member 111.

In the cutter, the balance bar 101 is pivotally mounted in the housing 102 with the pivoting pin 110 engaged in the housing.

In operation, the centrifugal force on the extended line is detected by wrapping the line around the balance bar 101 at the vertical portion 108A of the member 108 and is opposed by the force generated by the balance bar 101. The engagement member 111 of the balance bar 101 engages with a locking face E of the rib 104.

As the line force decreases due to a decrease in length of the cutting line, the balance bar 101 pivots about pivot 110 when the force from the line becomes less than or equal to the force from the bar at point 108A, the member 111 is freed from the locking face E and the spool 103 is free to rotate relative to the housing.

As the line feeds out, the engagement member 111 of the balance bar 101 is returned by the rotary action of the spool 103 to the next locking position, stopping the relative rotation and thus allowing the force of the line to act on portion 108A again.

The operation of the return mechanism illustrated in FIGS. 11 and 12 is similar to that of the return mechanism of FIGS. 1 to 6.

The above described embodiments, of course, are not to be construed as limiting the breadth of the present invention. Modifications, and other alternative constructions, will be apparent which are within the spirit and scope of the invention as defined in the appended claims.

I claim:

1. A device for cutting vegetation, comprising;
   a housing rotatable about an axis;
   a rotatable spool within the housing storing a supply of flexible line having an end extending through an aperture in the housing into a cutting plane normal to said axis;
   said housing and said spool being interconnected to rotate together about said axis;
   means for causing relative rotation between said spool and said housing whenever the length of line extending into said cutting plane is less than a predetermined length, to cause additional line to be fed into said cutting plane; and
   said means comprising:
   a series of locking faces located within the housing and angularly spaced apart around said axis, said locking faces being rotated about said axis by rotation of said housing and said spool about said axis;
   (b) a balance bar pivotally mounted inside the housing for pivotal movement about a pivot point which rotates about said axis as said housing and said spool rotate about said axis, said balance bar having a member engageable with said locking faces and to one side of said pivot point, the balance bar having a center of gravity which is disposed on an opposite side of said pivot point from said member; and
   (c) means tending to direct said member onto said locking faces.

2. A device as claimed in claim 1 wherein said series of angularly-spaced locking faces is provided on an intermediate member drivingly connected to said spool.

3. A device as claimed in claim 1 wherein said housing is attached to the shaft of a motor and drives said spool.

4. A device as claimed in claim 1 wherein said series of angularly-spaced locking faces is formed on said spool and said balance bar is pivotally mounted on said housing.

5. A device as claimed in claim 1 in which said series of locking faces is provided by a continuous series of spaced teeth and recesses formed adjacent the periphery of a flange of said spool.

6. A device as claimed in claim 1 wherein said means for directing said member on said balance bar onto said locking faces is spring-biased.

7. A device as claimed in claim 1 wherein said means for directing said member on said balance bar onto said locking faces comprises a cam mounted radially inwardly of said locking faces and rotatable therewith, said cam having a surface acting to direct said member on said balance bar onto said locking faces.

8. A device as claimed in claim 7 wherein said cam is mounted so as to be capable of limited rotation relative to said series of locking faces.

9. A device as claimed in claim 8 wherein said limited relative rotation is spring opposed.

10. A device for cutting vegetation, comprising:
 (i) a housing rotatable about an axis;
 (ii) a spool within and rotatable with the housing and storing a supply of flexible line having an end extending through an aperture in the housing into a cutting plane normal to said axis; and
 (iii) means for causing relative rotation between said spool and said housing whenever the length of line extending into said cutting plane is less than a predetermined length, to cause additional line to be fed into said cutting plane;
 wherein said means comprises:
  (a) a series of locking faces associated with said spool and rotatable therewith about said axis, said locking faces being angularly spaced apart around said axis inside said housing;
  (b) a balance bar pivotally mounted on the housing, said balance bar having a member for engagement with said locking faces; and
  (c) means for positively engaging said member onto said locking faces.

11. A device as claimed in claim 10 wherein said series of angularly-spaced locking faces is provided on an intermediate member drivingly connected to said spool.

12. A device as claimed in claim 10 wherein said housing is attached to the shaft of a motor and drives said spool.

13. A device as claimed in claim 10 wherein said series of angularly-spaced locking faces is formed on said spool.

14. A device as claimed in claim 10 wherein said spool has a flange with a recess therein defining a radially inwardly facing surface, and said series of angularly-spaced locking faces is formed in said inwardly facing surface.

15. A device as claimed in claim 11 wherein said series of locking faces is provided by a continuous series of spaced teeth and recesses formed adjacent the periphery of said intermediate member.

16. A device as claimed in claim 10 wherein the means for directing said member on said balance bar onto said locking faces is spring-biased.

17. A device as claimed in claim 10 wherein the means for directing said member on said balance bar onto said locking faces comprises a rotatable cam having a surface acting to direct said member on said balance bar onto said locking faces.

18. A device as claimed in claim 17 wherein said cam is mounted so as to be capable of limited rotation relative to said series of locking faces.

19. A device as claimed in claim 18 wherein said limited relative rotation is opposed by spring means.

20. A device is claimed in claim 10 wherein said balance bar is mounted so that the centre of gravity of said balance bar is on the side of the pivot point opposite said member for engagement.

21. A device for cutting vegetation, comprising:
 a housing rotatable about an axis;
 a rotatable flanged spool within the housing storing a supply of flexible line having an end extending through an aperture in the housing into a cutting plane normal to said axis;
 means for causing relative rotation between said spool and said housing whenever the length of line extending into said cutting plane is less than a predetermined length, to cause additional line to be fed into said cutting plane; and
 said means including:
  (a) a series of angularly-spaced locking faces provided on a flange of the spool;
  (b) a balance bar located inside the housing and pivotal relative to the housing about a pivotal axis, said balance bar having a member for engagement with said locking faces, and the center of gravity of said balance bar and said engagement member being on opposite sides of said pivotal axis; and
  (c) means for tending to direct said engagement member onto said locking faces.

22. The device of claim 21, wherein said tending to direct means comprises a cam located centrally of said locking faces and defining a continuous path between an outer periphery of said cam and said locking faces, said engagement member engaging and being restrained in said path, and said cam being rotatably displaceable relative to said spool flange to change the configuration of said path for enabling controlled passage of said engagement member along said path.

23. A device for cutting vegetation, comprising:
 a housing rotatable about an axis and having an aperture in a side wall;
 a spool within and rotatable with the housing, the spool storing a supply of flexible line having an end extending outwardly through said aperture into a cutting plane normal to said axis;
 means for causing relative rotation between said spool and said housing whenever the length of line extending into said cutting plane is less than a predetermined length, to cause additional line to be fed into said cutting plane; and
  (a) a cam member connected to said spool for rotation therewith, said cam member having a series of locking faces angularly spaced apart about said axis;
  (b) a balance bar pivotally mounted on the housing and having a projection engageable with said locking faces; and (c) means for engaging said projection against said locking faces.

24. A device for cutting vegetation, comprising:

two rotatable members formed by a housing and a spool;

said housing being rotatable about a central axis and having an outer side wall with an aperture therein;

said spool being within and rotatable with said housing with a supply of flexible line stored on the spool, a free end of said line extending outwardly through said aperture to define in use a cutting plane normal to said axis;

a cam located within said housing centrally of and rotatable about said axis, said cam having a radially outwardly directed face formed with a first series of teeth and recesses;

a second series of teeth and recesses formed on a radially inwardly directed face of one of said two rotatable members;

said second series of teeth and recesses surrounding said first series to define a continuous path about said axis between said first and second series, said path having a variable configuration;

said cam being rotatably displaceable relative to said one of said rotatable members to change the configuration of said path;

a balance bar located inside said housing and pivotally mounted on the other of said two rotatable members for limited pivotal movement about a pivotal axis; and a projection on said balance bar engaged in said path, said projection and the center of gravity of said balance bar being on opposite sides of said pivotal axis to bias said balance bar in one pivotal direction and cause said projection to be locked in said path against relative movement therealong during use when a required predetermined length of the line extends into said cutting plane, but upon said length becoming less than said required predetermined length said balance bar becoming biased in the opposite pivotal direction to enable said projection to move progressively along said path with changing configuration of said path to cause additional line to be fed from said spool into said cutting plane until the required predetermined length of line again extends into the cutting plane.

25. The device of claim 24, wherein said one of said rotatable members is the spool.

* * * * *